United States Patent
Alexiou et al.

(10) Patent No.: US 8,391,206 B2
(45) Date of Patent: Mar. 5, 2013

(54) METHOD OF JOINT RESOURCE ALLOCATION AND CLUSTERING OF BASE STATIONS

(75) Inventors: Angeliki Alexiou, Swindon (GB); Federico Boccardi, Swindon (GB); Howard C. Huang, New York, NY (US)

(73) Assignee: Alcatel Lucent, Paris (FR)

( * ) Notice: Subject to any disclaimer, the term of this patent is extended or adjusted under 35 U.S.C. 154(b) by 974 days.

(21) Appl. No.: 12/187,602

(22) Filed: Aug. 7, 2008

(65) Prior Publication Data
US 2010/0034151 A1 Feb. 11, 2010

(51) Int. Cl.
*H04W 4/00* (2009.01)
(52) U.S. Cl. .................................................. 370/328
(58) Field of Classification Search .................. 370/229, 370/252, 277, 278, 280–282, 310.2, 311, 370/312, 317–322, 328–349, 395.5, 395.41, 370/436, 437, 442–444, 458, 462, 465, 468, 370/477, 478, 480; 455/422.1–460, 524–525, 455/464, 509
See application file for complete search history.

(56) References Cited

U.S. PATENT DOCUMENTS
2008/0285490 A1* 11/2008 Mukai et al. .................. 370/280
2011/0090836 A1* 4/2011 Mochizuki et al. ........... 370/312

OTHER PUBLICATIONS

International PCT Search Report PCT/US2009/0042800 dated Oct. 30, 2009.
Written Opinion.
Papadogiannis A et al., "A Dynamic Clustering Approach in Wireless Networks with Multi-Cell Cooperative Processing" Communications 2008 ICC '08 IEEE International Conference on, IEEE, Piscataway N.J., U.S.A. May 19, 2008; XP031266078.
Sivarama Venkatesan Ed Coordinating Base Stations for Greater Uplink Spectral Efficiency in a Cellular Network; IEEE International Symposium on Personal, Indoor and Mobile Radio Communications, PIMRC, IEEE; Sep. 1, 2007, pp. 1-5, XP031168849.
Alcatel Shanghai Bell et al., "Multi-Cell MIMO with distributed inter-cell interference suppression for LTE-A Uplink" 3Gpp Draft; R1-082499 Multicell MIMO, $3^{rd}$ Generation Partnership Project (3GPP) Mobile Competence Centre; 650, Route DES Lucioles; F-06921 Sophia-Antipolis Cedex; France, vol. RAN WG1, no. Warsaw, Poland; 20080624, Jun. 24, 2008 XP050110767.

* cited by examiner

*Primary Examiner* — Kwang B Yao
*Assistant Examiner* — Tung Q Tran
(74) *Attorney, Agent, or Firm* — Williams, Morgan & Amerson (57) ABSTRACT

The present invention provides a method for implementation in a first functional entity in a wireless communication system that includes a first plurality of base stations for providing wireless connectivity to at least one mobile unit. In one embodiment of the method includes receiving, at the first functional entity, channel state information associated with a plurality of wireless communication channels between the first plurality of base stations and the mobile unit. Selection of a second plurality of base stations from the first plurality of base stations is performed jointly with resource allocation to the second plurality of base stations using the channel state information. The first functional entity then communicates information indicative of the selected second plurality of base stations and the allocated resources to the selected second plurality of base stations.

13 Claims, 7 Drawing Sheets

METHOD OF JOINT RESOURCE ALLOCATION AND CLUSTERING OF BASE STATIONS

CROSS REFERENCE TO RELATED APPLICATIONS

This application is related to U.S. patent application Ser. No. 12/140,537, filed on Jun. 17, 2008 entitled "Method for Adaptive Formation of Cell Clusters for Cellular Wireless Networks with Coordinated Transmission and Reception."

BACKGROUND OF THE INVENTION

1. Field of the Invention

This invention relates generally to communication systems, and, more particularly, to wireless communication systems.

2. Description of the Related Art

Base stations in wireless communication systems provide wireless connectivity to users within a geographic area, or cell, associated with the base station. In some cases, the cell may be divided into sectors that subtend a selected opening angle (e.g., three 120° sectors or six 60° sectors) and are served by different antennas. The wireless communication links between the base station and each of the users typically includes one or more downlink (DL) (or forward) channels for transmitting information from the base station to the mobile unit and one or more uplink (UL) (or reverse) channels for transmitting information from the mobile unit to the base station. The uplink and/or downlink channels include traffic channels, signaling channels, broadcast channels, paging channels, pilot channels, and the like. The channels can be defined according to various protocols including time division multiple access (TDMA), frequency division multiple access (FDMA), code division multiple access (CDMA), orthogonal frequency division multiple access (OFDMA), as well as combinations of these techniques. The geographical extent of each cell may be time variable and may be determined by the transmission powers used by the base stations, access point, and/or mobile units, as well as by environmental conditions, physical obstructions, and the like.

Mobile units are assigned to base stations based upon properties of the channels of supported by the corresponding air interface. For example, in a traditional cellular system, each mobile unit is assigned to a cell on the basis of criteria such as the uplink and/or downlink signal strength. The mobile unit then communicates with that serving cell over the appropriate uplink and/or downlink channels. Signals transmitted between the mobile unit and the serving cell may interfere with communications between other mobile units and/or other cells. For example, mobile units and/or base stations create intercell interference for all other sites that use the same time/frequency resources. The increasing demand for wireless communication resources has pushed service providers towards implementing universal resource reuse, which increases the likelihood of intercell interference. In fact, the performance of modern systems is primarily limited by intercell interference, which dominates the underlying thermal noise.

Intercell interference can be reduced in several ways, for example through frequency planning, soft handoff, or beamforming multiple antennas. For example, multiple-input-multiple-output (MIMO) techniques may be employed when the base station and, optionally, the user terminals include multiple antennas. For example, a base station that includes multiple antennas can concurrently transmit multiple independent and distinct signals on the same frequency band to same user or multiple users in a cell/sector. MIMO techniques are capable of increasing the spectral efficiency of the wireless communication system roughly in proportion to the number of antennas available at the base station.

Although conventional wireless communication systems attempt to reduce the effects of intercell interference using various interference cancellation techniques, alternative approaches recognize that intercell "interference" is actually caused by signals that include valuable information. For example, on the uplink, intercell interference at one cell site is merely a superposition of signals that were intended for other cell sites, i.e., the intercell interference is formed of mobile unit signals that have been collected at the wrong place. If these signals could be properly classified and routed, they would cease to be interference and would become useful in the detection of the information they bear. While challenging, combining information received at disparate sites is theoretically possible because the cell sites are connected to a common and powerful backbone network. This is tantamount to recognizing that a network of wireless cell sites can form a large distributed multi-access channel and all users can be served through all the cell sites. This ambitious approach leverages the bandwidth available in wireline networks to transcend intercell interference and alleviate the wireless bottleneck. For example, a new class of multi-antenna techniques called Inter-Base Station MIMO (IBS-MIMO) has been proposed to enhance air-interface performance by enabling concurrent transmission of superposed signal waveforms from antennas at different base stations to one or more mobile terminals in such a way that the resulting mutual interference is suppressed.

On the downlink, IBS-MIMO techniques coordinate different base stations so that they concurrently transmit (in a coordinated fashion) superposed signal waveforms from their antennas to one or more mobile units in such a way that the resulting mutual interference is suppressed and the signals from multiple base stations may be coherently combined at each mobile unit. In this process, the signal destined for a specific mobile unit can be transmitted from different base stations. The radio access network provides control signaling and/or data plane exchanges to coordinate the base stations so that their transmissions can be coherently combined. For example, each user's signal can be transmitted simultaneously from multiple base station antennas (possibly spatially distributed). The signals are weighted and pre-processed so that intercell interference is mitigated or completely eliminated by coherent combination of the superposed signals from the different base stations. Under the assumption of full coordination between the M antennas of all B base stations in the system, the behaviour of the system is the same as a MU-MIMO (multiuser multi-input multi-output) system with B*M distributed antennas. The system typically employs hybrid per-cluster power constraints so that clusters of antennas in the same site are subject to a sum-power constraint and power is not shared between antennas belonging to different clusters.

Numerous constraints, including constraints on the available backhaul bandwidth, may make it difficult or impossible to implement full network coordination in real systems. For example, implementing full network coordination may increase the backhaul overhead required for signaling and data transmissions by orders of magnitude relative to the backhaul bandwidth used for conventional uncoordinated transmission. For example, assuming full coordination between B=10 base stations and a star network topology, the amount of data traffic in the backhaul increases by approximately a factor of 10. Even if this additional backhaul bandwidth can be accommodated within the system, system designers may consider this an unacceptably large cost to achieve the performance gains provided by full coordination of the base stations in the network.

The backhaul bandwidth and/or overhead can be reduced by limiting coordination to a subset of the base stations and/or cells within the system. Different approaches have been considered in order to limit the coordination to only a subset of the cells in the system. One approach to coordinating uplink and downlink transmissions divides users into different groups that use orthogonal resources such as orthogonal codes, time intervals, frequencies, and the like. Joint detection can be used only for users belonging to the same group. In this technique, weak users (i.e. users at the edge of the cells) are grouped together and the base-station coordination is realized starting from the weak users until a predetermined constraint on the backhaul is achieved. Users are assigned to the groups using channel state information that is averaged over a relatively long time period, such as several seconds. Consequently, this technique does not consider the dynamics of the uplink and/or downlink channels.

One alternative base station selection algorithm selects base stations to minimize the power used to satisfy an equal-rate requirement for uplink transmission. Power allocation, receive (linear) beamforming and cluster assignment are jointly realized for the selected base stations. The equal-rate requirement a test you provide a minimum data transmission rate or quality-of-service level for each user. This requirement is typically used for circuit-based transmissions such as voice service. However, this base station selection algorithm does not incorporate information that reflects the dynamic, time-variable, channel conditions. For example, the algorithm does not schedule or allocate resources based upon the changing channel conditions. Consequently, the main limitation of this work is the lack of diversity with respect to changing channel conditions.

Another alternative dynamic clustering technique selects base stations to maximize the sum-rate for uplink transmissions. In this technique, each base station implements a separate scheduler to choose/schedule users and then a central entity forms clusters of base stations associated with the scheduled users. For example, for each time slot one user per cell is selected using round robin scheduling. At that time slot and for those specific users selected, the algorithm chooses the best base stations in order to serve those users using joint combining.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for implementation in a first functional entity in a wireless communication system that includes a first plurality of base stations for providing wireless connectivity to at least one mobile unit. In one embodiment of the method includes receiving, at the first functional entity, channel state information associated with a plurality of wireless communication channels between the first plurality of base stations and the mobile unit. Selection of a second plurality of base stations from the first plurality of base stations is performed jointly with resource allocation to the second plurality of base stations using the channel state information. The first functional entity then communicates information indicative of the selected second plurality of base stations and the allocated resources to the selected second plurality of base stations.

In another embodiment, a method is provided for implementation in a first base station in a wireless communication system that includes a first plurality of base stations for providing wireless connectivity to at least one mobile unit. The method may include transmitting, to a first functional entity in the wireless communication system, channel state information associated with at least one wireless communication channel between the first base station and the mobile unit. The method also includes receiving, from the first functional entity, information indicating that the first base station is one of a second plurality of base stations. Selection of the second plurality of base stations is performed jointly with allocation of resources to the second plurality of base stations using the channel state information.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
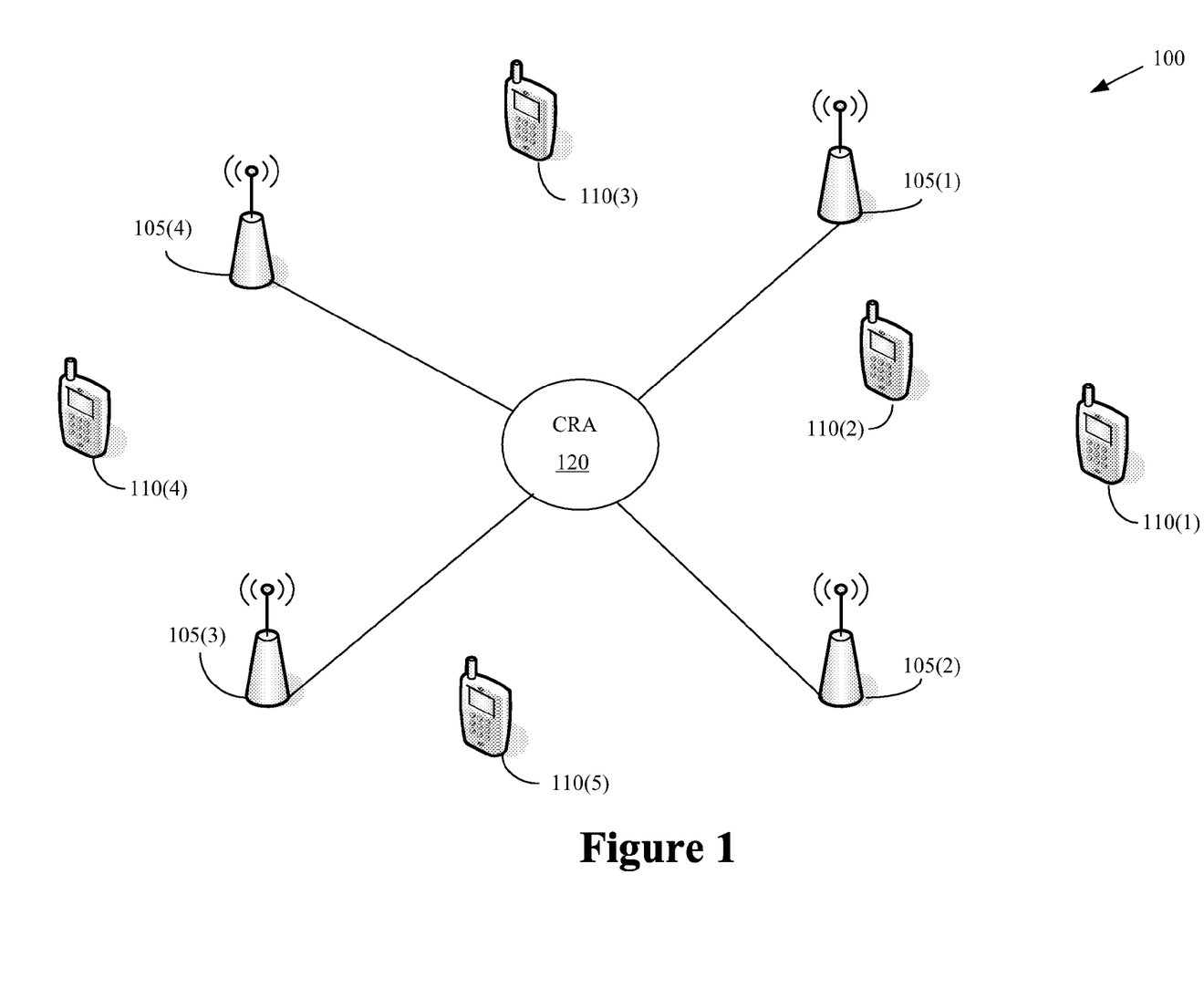
FIG. 1 conceptually illustrates a first exemplary embodiment of a wireless communication system.

FIG. 1 conceptually illustrates a first exemplary embodiment of a wireless communication system 100. In the illustrated embodiment, the wireless communication system 100 operates according to standards and/or protocols defined for Universal Mobile Telecommunication System (UMTS) technologies, such as UMTS Terrestrial Radio Access (UTRA) technologies. Although the principles of the example embodiments described herein may be particularly well-suited for wireless communication systems based on UMTS evolved UTRA technologies, standards and techniques, and may be described in this example context, the example embodiments shown and described herein are meant to be illustrative only and are not intended to be limiting in any way. Example embodiments are also applicable to other radio networks and/or developing fourth generation (4G) wireless communication systems such as 802.16e, 802.16m, WiMax, and EV-DO Revision C. As such, various modifications will be apparent to those skilled in the art for application to other wireless communication systems and are contemplated by the teachings herein.

The wireless communication system 100 includes a plurality of base stations 105(1-4). The distinguishing indices (1-4) may be used to indicate individual base stations 105(1) or subsets of the base stations 105(1-2). However, these indices may be dropped when referring to the base stations 105 collectively. This convention may be applied to other elements depicted in the figures and referred to using a numeral and one or more distinguishing indices. The base stations 105 are configured to provide wireless connectivity, which includes transmitting signals over an air interface, receiving signals over the air interface, and performing measurements related to communication over the air interface. Techniques for transmitting, receiving, and measuring are known in the art and in the interest of clarity only those aspects of these techniques that are relevant to the present invention will be discussed herein. Persons of ordinary skill in the art having benefit of the present disclosure will appreciate that the present invention is not limited to a wireless communication system 100 including any particular number of base stations 105. Furthermore, persons of ordinary skill in the art having benefit of the present disclosure will appreciate that alternative embodiments of the wireless communication system 100 may include other functional entities for providing wireless connectivity including, but not limited to, access points, base station routers, node-Bs, and the like.

One or more mobile units 110 can access the wireless communication system 100 by establishing one or more wireless communication links (or legs) to one or more of the base stations 105. Techniques for establishing, maintaining, communicating over, and/or tearing down the wireless communication links are known in the art and in the interest of clarity only those aspects of these techniques that are relevant to the present invention will be discussed herein. Persons of ordinary skill in the art having benefit of the present disclosure should appreciate that the wireless communication system 100 is not limited to any particular number of mobile units 110. Persons of ordinary skill in the art having benefit of the present disclosure should also appreciate that the mobile units 110 may also be referred to as mobile stations, subscriber stations, subscriber terminals, user equipment, and the like.

The wireless communication system 100 implements IBS-MIMO techniques for uplink (reverse link) and/or downlink (forward link) transmissions. In embodiments that implement IBS-MIMO techniques on the downlink, operation of a selected group (or cluster) of base stations 105 is coordinated so that the base stations 105 in the coordination cluster concurrently transmit superposed signal waveforms from their antennas to one or more mobile units 110 in such a way that the resulting mutual interference is suppressed and the signals from multiple base stations 105 may be coherently combined at each mobile unit 110. In embodiments that implement IBS-MIMO techniques on the uplink, signals received by base stations 105 in a coordination cluster can be shared and coherently combined so that the mutual interference is suppressed in the demodulating/decoding process.

Coordination clusters can include any number of base stations 105 and the base stations 105 in any particular cluster can vary over time. Each mobile unit 110 can be associated with a different coordination cluster. Alternatively, groups of mobile units 110 can be associated with a selected coordination cluster. As used herein, the term "associated with" implies a pairing of a mobile unit 110 (or group thereof) with the base stations 105 in a coordination cluster. However, it is not necessary for the mobile unit 110 and the base station(s) 105 to be actively communicating information to be associated with a coordination cluster. For example, the wireless communication system 100 and an idle mobile unit 110 may store information indicating the coordination cluster for the idle mobile unit 110 so that communication can be initiated as soon as there is information available for transmission between the mobile unit 110 and the wireless communication system 100. In one embodiment, mobile units 110 are associated with the same coordination cluster for both uplink and downlink transmissions. However, in alternative embodiments, mobile units 110 may be associated with one coordination cluster for uplink transmission in a different coordination cluster for downlink transmissions.

A common resource allocator (CRA) 120 is used to jointly form coordination clusters, select the mobile units 110 associated with the coordination clusters, and allocate resources used for communication between the base stations 105 in the coordination clusters and the associated mobile units 110. For example, the common resource allocator 120 may form a coordination cluster including the base stations 105(1-2) and then associate the mobile units 110(1-2) with this coordination cluster. In one embodiment, the common resource allocator 120 is implemented in a centralized location, such as a radio network controller. However, in alternative embodiments, the functionality of the common resource allocator 120 may be distributed throughout different locations in the wireless communication system 100. Furthermore, the wireless communication system 100 may include more than one common resource allocator 120. Each common resource allocator 120 may be responsible for coordinating operations of a different set of base stations 105.

The common resource allocator 120 uses channel state information provided by the base stations 105 to jointly schedule and allocate the communication resources. In one embodiment, the base stations 105 perform various measurements of the channel conditions (e.g., using pilot signals, bit error rates, and the like) for the uplink and/or downlink channels of the wireless communication links between the base stations 105 and the mobile units 110. The base stations 105 may then report the results of these measurements to the common resource allocator 120, which can then use measurements collected from all the base stations 105 to perform the joint scheduling and allocation processes. In one embodiment, the base stations 105 may also provide scheduling requirements to the common resource allocator 120 for use in the joint scheduling and allocation process. Exemplary scheduling requirements may include but are not limited to latency requirements associated with the mobile units 110 and/or buffer occupancies associated with data to be transmitted to the mobile units 110.

Once the common resource allocator 120 has defined the coordination clusters for each mobile unit 110 and allocated resources for communication with these mobile units 110, the common resource allocator 120 provide this information to the base stations 105. In one embodiment, the resource allocation includes transmission times and/or transmission time intervals, beamforming coefficients, and power allocations and so this information can be conveyed to the base stations 105 along with information instructing the base stations 105 to communicate with the mobile units 110 that are associated with the coordination clusters that include the base station 105. The information communicated by the common resource allocator 120 may also include lists of other base stations 105 in the coordination clusters so that each base station 105 can share data with other base stations 105 in its coordination clusters. By limiting data sharing to only the base stations 105 that are in the coordination clusters determined by the common resource allocator 120, signaling due to data sharing is significantly reduced. For example, under low Doppler conditions the signaling used to support data sharing involves 90% of the backhaul traffic in a system that supports full network coordination.

Figure 2A:
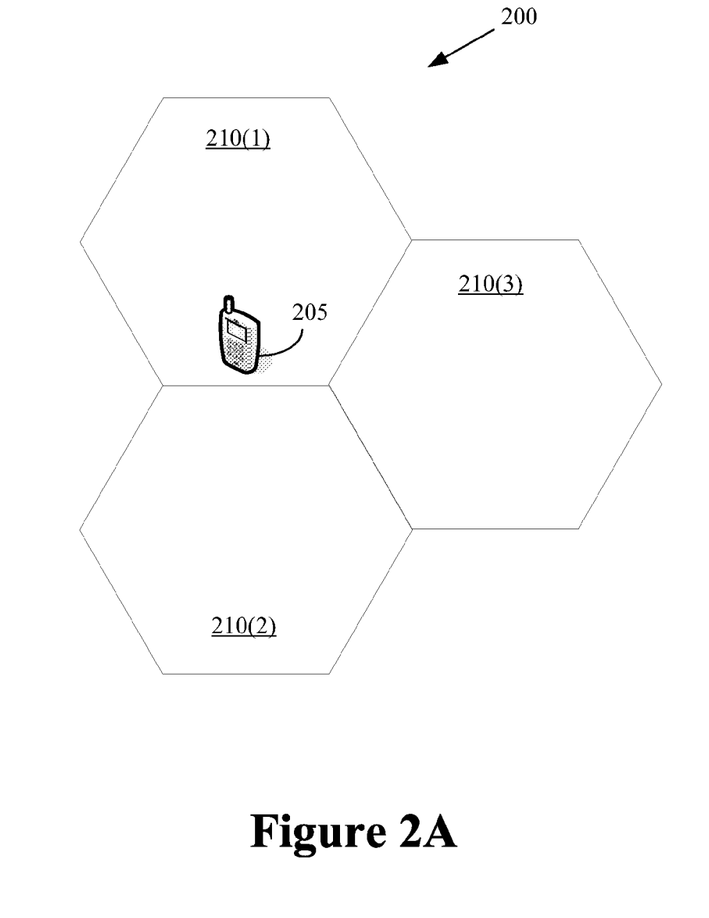
FIGS. 2A and 2B conceptually illustrate a second exemplary embodiment of a wireless communication system.
Figure 2B:
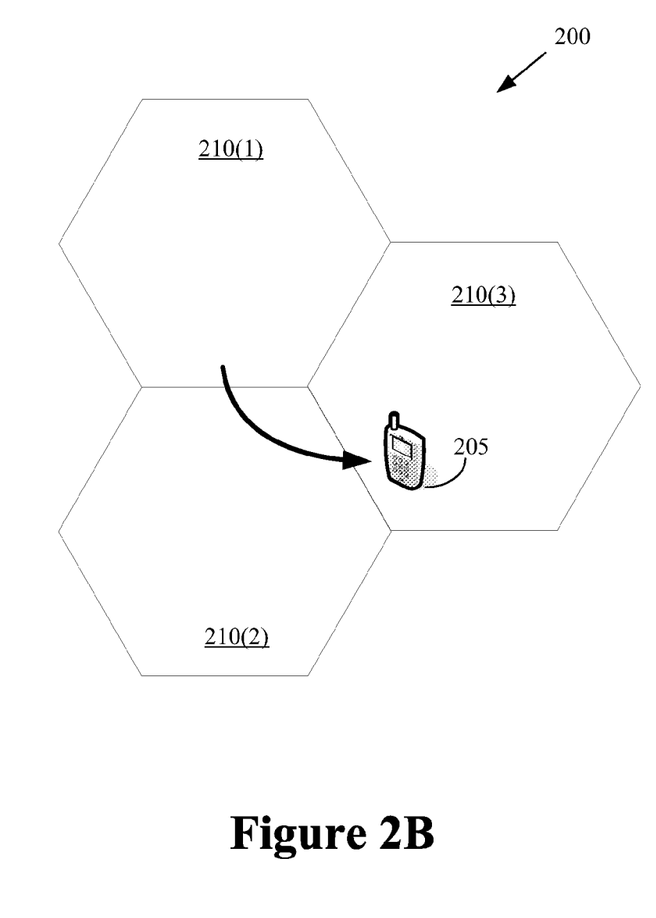

FIGS. 2A and 2B conceptually illustrate a second exemplary embodiment of a wireless communication system 200. In the second exemplary embodiment, a mobile unit 205 is initially assigned to a coordination cluster including the cells 210(1-2). However, the mobile unit 205 may roam to a different location, as indicated by the boldfaced therein FIG. 2B. The roaming mobile unit 205 may then be assigned to a different coordination cluster including the cells 210(2-3). To accommodate roaming of mobile units 205, joint scheduling and resource allocation may be performed iteratively so that the coordination clusters and the associated mobile units 205 can be a substantially continuously updated and/or updated at selected intervals.

Figure 3A:
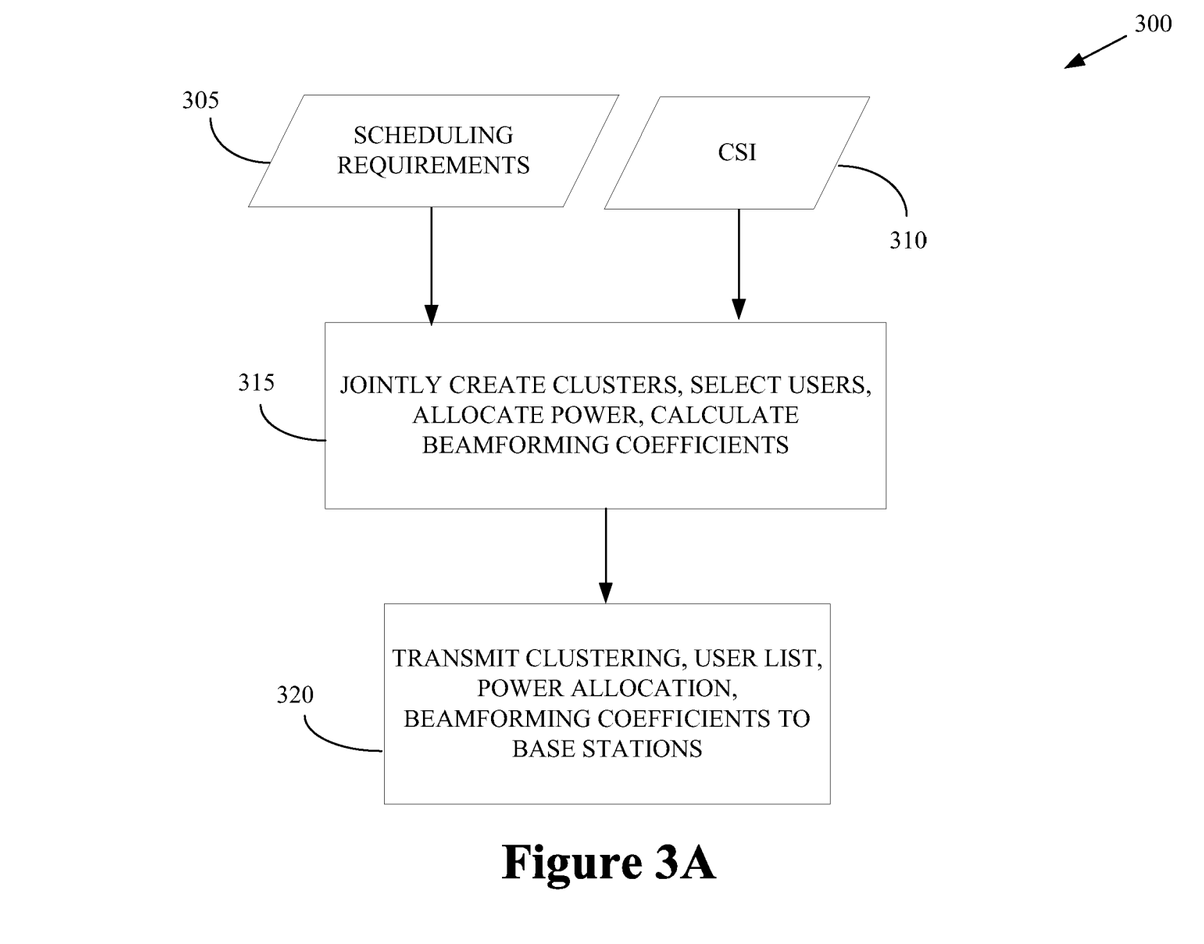
FIGS. 3A and 3B conceptually illustrate first and second exemplary embodiments of a method of jointly selecting base stations and allocating resources.
Figure 3B:
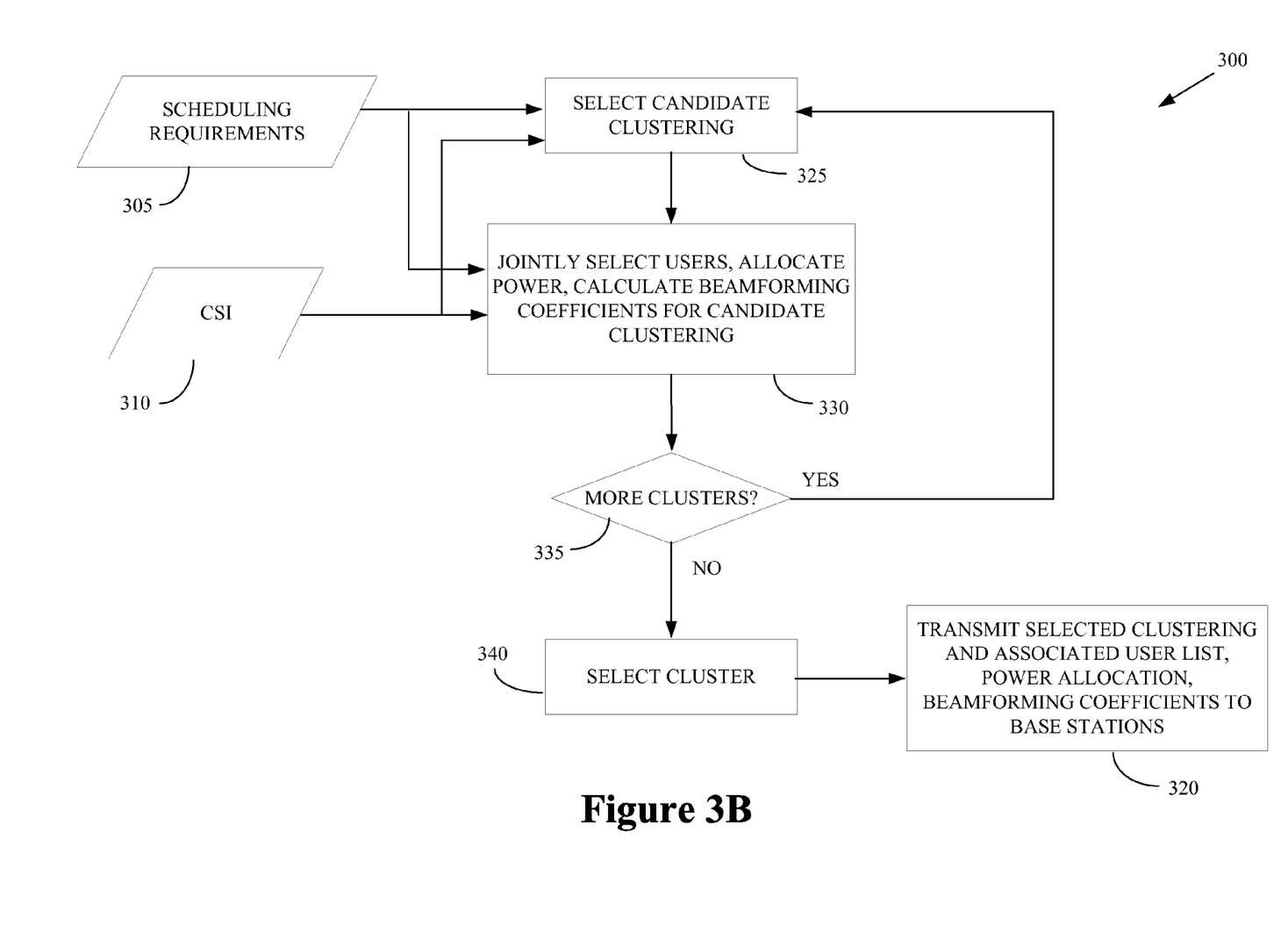

FIGS. 3A and 3B conceptually illustrate first and second exemplary embodiments of a method 300 of jointly selecting base stations and allocating resources. Embodiments of the method 300 may be implemented in a functional entity such as the common resource allocator 120 shown in FIG. 1. The method 300 can be performed iteratively and can be repeated substantially continuously, at selected intervals, or in response to satisfying some other criterion such as a change in one or more parameters derived from the channel state information. Accordingly, each base station can send channel estimates (e.g., SINR, signal phase, signal amplitude, long term, fast-fading, covariance, user position) to the allocation entity substantially continuously or at other intervals depending on the different algorithms used for scheduling and performing resource allocation such as calculating the beamforming coefficients.

The method 300 uses a model of the wireless air interface to jointly form coordination clusters, associate these clusters with users, and allocate resources to the base stations in the coordination clusters. In the illustrated embodiment, the model defines N as the number of base stations in the system, M as the number of antennas at each base station, B as the maximum dimension of each cluster, K as the number of users in the network, L as the number of receive antennas at each user, and $\alpha_1, \ldots, \alpha_K$ as the quality of service weights associated to the different users.

The channel from the n-th base station and the k-th user is represented by the L×M matrix $H_k^{(n)}$. The channel coefficient between the m-th antenna of the n-th base and the k-th user is modelled as $$H_{km}^{(n)} = \Gamma_{km}^{(n)} \sqrt{\beta d_k^{(n)-\alpha}} \gamma_k^{(n)}$$

where $\Gamma_{km}^{(n)}$ is the fast fading coefficient, $\beta$ is the path-loss constant, $d_k^{(n)}$ is the distance in km between n-th base-station and the kth user, $\alpha$ is the path-loss exponent and $\gamma_k^{(n)}$ models the shadowing term. The vector $w_k^{(n)}$ indicates the M×1 precoding vector used for the k-th user in the nth base-station. The variable $C=\{C_1, \ldots, C_{N_c}\}$ is the set of base-station clusters for a given clustering, where $N_c=|C|$, and $U_l$, $l=1, \ldots, N_C$, is the set of users allocated for transmission in the l-th cluster. The model also defines U as $U=\{U_1, \ldots, U_{N_c}\}$.

The signal received by the k-th user belonging to the l-th cluster can be written as $$y_k = \sum_{n \in C_l} H_k^{(n)} w_k^{(n)} u_k + \sum_{\substack{i \in U_l \\ i \neq k}} \sum_{n \in C_l} H_k^{(n)} w_i^{(n)} u_i + \sum_{j \neq l} \sum_{i \in U_j} \sum_{n \in C_j} H_k^{(n)} w_i^{(n)} u_i + n_k$$

where the first term represents the useful signal, the second term represents the interference due to the signals sent to the users in the same cluster, the third term represents the interference due to the signals coming from other clusters, the last term the thermal noise. The vector $v_k^H$ indicates the 1×L receive combiner. The signal after the combining state can be written as $$\tilde{y}_k = v_k^H y_k.$$

The SINR of the k-th user as function of (C,U) is given by $$\gamma_k(C, U) = \frac{\left| v_k^H \sum_{n \in C_l} H_k^{(n)} w_k^{(n)} \right|^2 P_k}{1 + \sum_{\substack{i \in U_l \\ i \neq k}} P_i \left| v_k^H \sum_{n \in C_l} H_k^{(n)} w_i^{(n)} \right|^2 + \sum_{j \neq l} \sum_{i \in U_j} P_i \left| v_k^H \sum_{n \in C_j} H_k^{(n)} w_i^{(n)} \right|^2} \quad (1)$$

where $P_k$ represents the power allocated to the k-th user. In alternative embodiments, the vector $w_k^{(n)}$ can be calculated by using a zero-forcing approach, a MMSE-based approach, or by using precoding techniques only requiring partial channel state information.

In the first exemplary embodiment of the method 300 shown in FIG. 3A, one or more scheduling requirements 305 (if available) and channel state information 310 associated with one or more users and base stations are provided to the allocation entity. The allocation entity then jointly (at 315) selects one or more users, creates one or more coordination clusters of base stations associated with the selected users, allocates power for transmission from the clustered base stations to the selected users, and calculates beamforming coefficients. The joint operations are performed (at 315) based on the channel state information and (if available) scheduling requirements provided by the users. However, persons of ordinary skill in the art having benefit of the present disclosure should appreciate that the allocation entity may also perform other operations using the channel state information and/or the scheduling requirements. The allocation entity may then transmit (at 320) information indicating the clustering, the user lists associated with each cluster, the power allocations, and the beamforming coefficients to the base stations.

In the second exemplary embodiment of the method 300 shown in FIG. 3B, the allocation entity iterates through a number of candidate clusters, jointly selects users and allocates resources to the selected users, and then selects one of the candidate clusters based upon a criterion such as a sum-rate criterion. For example, scheduling requirements 305 and channel state information 310 are first used to select (at 325) a candidate clustering of the base stations. For example, the candidate clustering could be selected (at 325) in a dynamic way, without any fixed or predetermined pattern for the coordination clusters. In this example, a greedy algorithm could be used, where at each step a new base station is added to a cluster such that the throughput is maximized and/or until the maximum dimension of the cluster is reached. Alternatively, the method 300 may select (at 325) the candidate cluster from a list of predetermined candidate coordination clusters for the scheduling and allocation. Using a predetermined set of candidate coordination clusters can reduce the complexity of the joint scheduling and allocation problem. For example, if $\overline{C}$ represents a set of possible coordination clusters, the computational complexity of the search can be reduced by properly setting the cardinality of the set $\overline{C}$.

The allocation entity then jointly (at 330) associates one or more users with the selected candidate coordination cluster, allocates power for transmission, and calculates beamforming coefficients. The joint operations are performed (at 330) based on the channel state information and (if available) scheduling requirements provided by the users. If more clusters are available for evaluation (as determined at 335), the allocation entity continues then selects (at 325) another candidate cluster and performs (at 330) the joint user selection and resource allocation.

Once all the clusters have been evaluated, the allocation entity selects (at 340) one of the candidate clusters and the associated users and allocated resources. In one embodiment, the allocation entity selects (at 340) a cluster to achieve the maximum possible sum-rate and/or weighted sum-rate. For example, the method 300 can evaluates the sum-rate obtained for a given clustering/user-set by calculating the beamforming coefficients and the power allocation as a function of the candidate clustering/user-set, the available channel state information, and (optionally) the scheduler requirements.

The allocation entity may then transmit (at 320) information indicating the clustering, the user lists associated with each cluster, the power allocations, and the beamforming coefficients to the base stations.

Figure 4A:
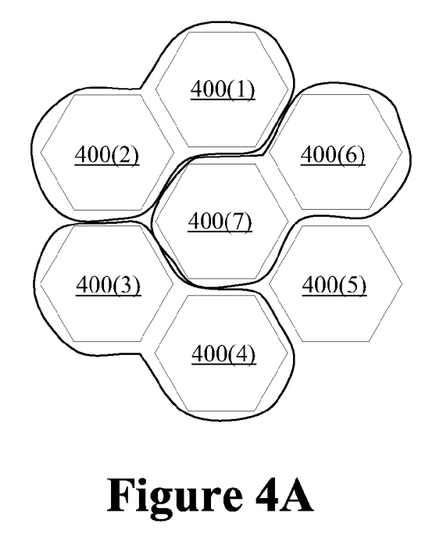
FIGS. 4A, 4B, and 4C conceptually illustrate one exemplary embodiment of a set of predetermined coordination clusters.
Figure 4B:
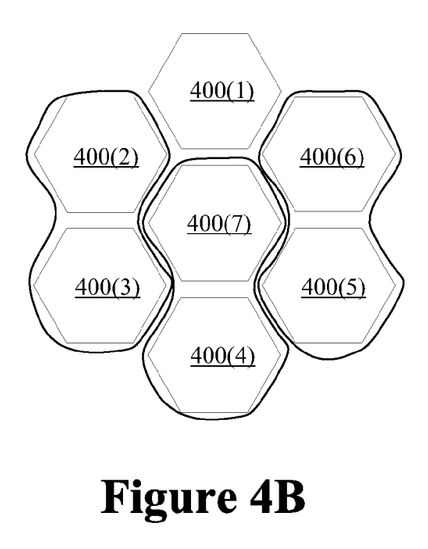
Figure 4C:
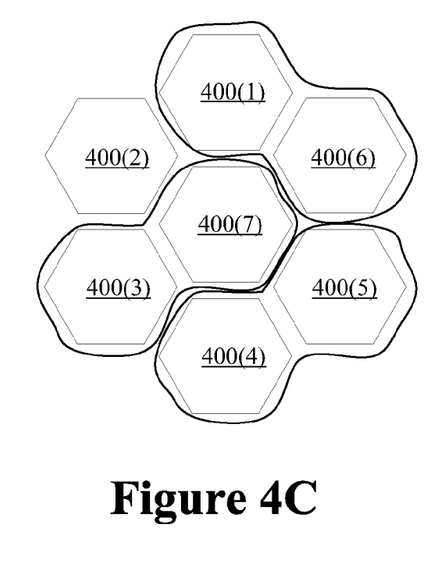

FIGS. 4A, 4B, and 4C conceptually illustrate one exemplary embodiment of a set of predetermined coordination clusters. In the illustrated embodiment, the figures depict three sets of candidate coordination clusters that can be used to group the seven cells 400 shown in these figures. The base stations in each candidate coordinate cluster are indicated by a bold loop. For example, FIG. 4A shows a first candidate set of coordination clusters in which a first cluster includes the cells 400(1-2), a second cluster includes the cells 400(6-7), a third cluster includes the cells 400(3-4), and a fourth cluster includes the cell 400(5). For another example, FIG. 4B shows a first candidate set of coordination clusters in which a first cluster includes the cells 400(2-3), a second cluster includes the cells 400(5-6), a third cluster includes the cells 400(4, 7), and a fourth cluster includes the cell 400(1). For yet another example, FIG. 4C shows a first candidate set of coordination clusters in which a first cluster includes the cells 400(1, 6), a second cluster includes the cells 400(3, 7), a third cluster includes the cells 400(4-5), and a fourth cluster includes the cell 400(2).

Under the assumption of a fixed candidate set of coordination clusters represented by the symbol $\Delta$, the problem of jointly scheduling the active users, selecting the clustering and allocating the users to a given cluster can be written as $$\begin{cases} \max_{C,U} \sum_{k \in U} \alpha_k \log(1 + \gamma_k(C, U)) \\ C \in \overline{C} \\ U_j \subseteq \{1, \ldots, K\}, j = 1, \ldots, N_C \\ U_i \cap U_j = \varnothing, i, j = 1, \ldots, N_C, i \neq j \end{cases} \quad (2)$$

In order to calculate the $$\sum_{k \in U} \alpha_k \log(1 + \gamma_k(C, U)),$$

a given embodiment could use a zero-forcing precoding strategy. For example, consider the l-th cluster. Assuming the number of antennas at the base station side equal to 1 (M=1), the equivalent channel matrix for the l-th cluster can be defined as follows:

$$H_{U_l}^{C_l} = \begin{bmatrix} H_1^1 & \cdots & H_1^{(C_l)} \\ \vdots & \ddots & \vdots \\ H_{|U_l|}^1 & \cdots & H_{|U_l|}^{(C_l)} \end{bmatrix}$$

Under a zero-forcing precoding strategy, $w_k^{(n)}$ is calculate as follows $$w_k^{(n)} = [H_{U_l}^{C_l H}(H_{U_l}^{C_l} H_{U_l}^{C_l H})^{-1}]_{k,n}$$

and the SINR (1) can be rewritten as.

$$\gamma_k(C, U) = \frac{\left|v_k^H \sum_{n \in U_l} H_k^{(n)} w_k^{(n)}\right|^2 P_k}{1 + \sum_{j \neq l} \sum_{i \in U_j} P_i \left|v_k^H \sum_{n \in C_j} H_k^{(n)} w_i^{(n)}\right|^2}$$

The described ZF approach can be extended to the case of multiple antennas at the base station (M>1) and multiple antennas at each receiver. Other embodiments can use a greedy user selection principle in order to lower the computational complexity for calculating the beamforming coefficients.

In one embodiment, the method 300 may also include an initial step where each user could be associated to the base station that guarantees the best long-term channel value (i.e. path loss+shadowing). In another alternative embodiment, iterations of the method 300 include choosing the set of active users within the set of users associated to the base station belonging to the cluster. Furthermore, the method 300 can be applied to both the case of overlapping clusters and the case of non-overlapping clusters. For example, the predetermined set of candidate coordination clusters could include one or more base stations that are shared between one or more clusters.

Figure 5:
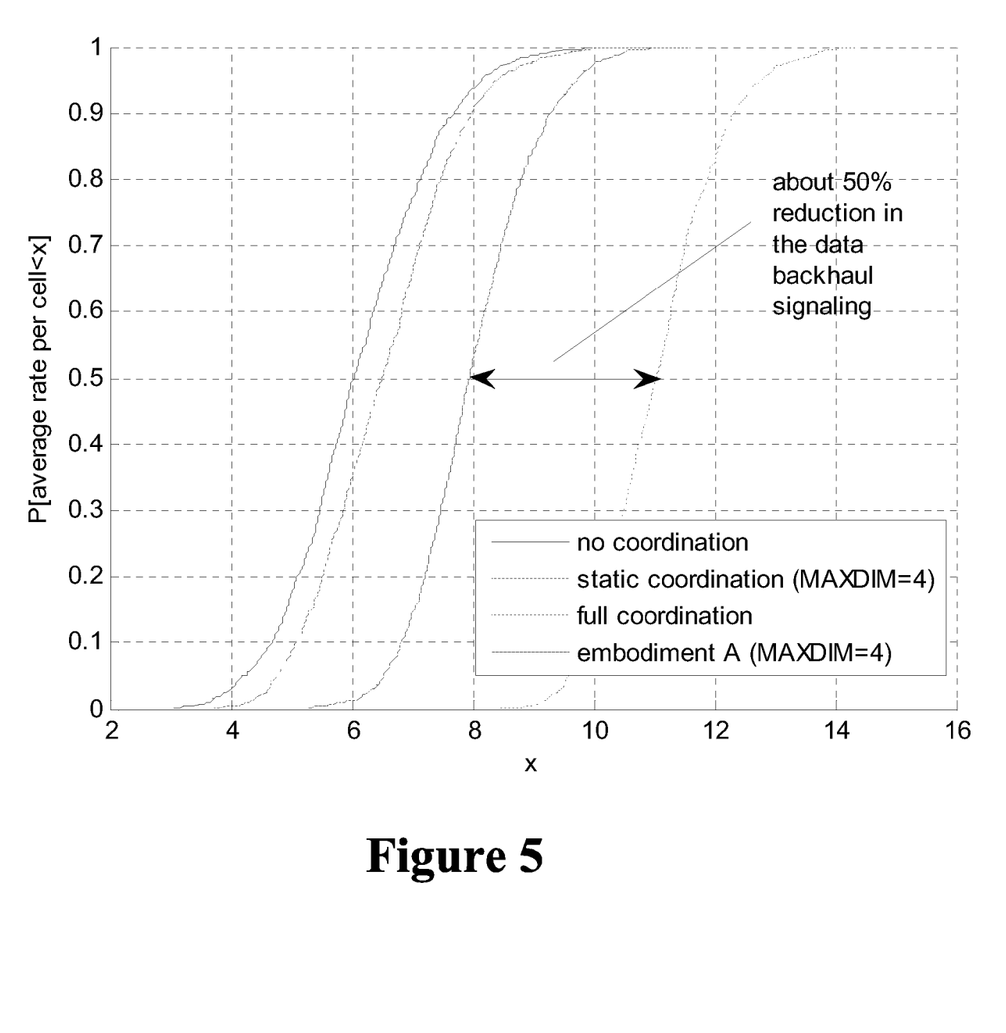
FIG. 5 shows a simulated probability that an average rate per cell is below a selected value for uncoordinated and coordinated algorithms.

FIG. 5 shows a simulated probability that an average rate per cell is below a selected value for uncoordinated and coordinated algorithms. The horizontal axis indicates the average rate per cell and the vertical axis indicates the probability that this average rate per cell is achieved in the simulation. The probabilities shown in FIG. 5 are computed using a system simulator that assumes that the wireless communication system includes 7 single antenna base stations and also assumes wraparound. The wraparound is designed in order to take into account of the effects of the cooperation at the edges of the central cluster. Consequently, each simulated user is affected by the same number of interfering base stations and each base station can potentially collaborate with the same number of neighbour base stations. Each single-antenna user is dropped with uniform probability inside each cell. Fairness is guaranteed by a proportional fairness scheduler. The SNR is defined as the reference SNR ad the cell vertex. A ZF precoder has been used. The simulation results assume that there are 20 users per cell, a reference SNR of 15 dB, a maximum cluster dimension equal to 4, a path loss exponent=5, no shadowing, and a proportional fair coefficient=0.01.

The four curves shown in FIG. 5 correspond to cases in which there is no coordination between the base stations, full coordination between all of the base stations, static coordination with a maximum dimension of 4, and dynamic coordination using the candidate coordination clusters shown in FIG. 4A. The simulation demonstrates that dynamic coordination using a predetermined set of candidate coordination clusters (which is a computationally efficient approach) achieves a typical rate that is almost 75% of the rate achieved by full coordination. At the same time, using a dynamic coordination reduces the backhaul signaling by about 50%.

Figure 6:
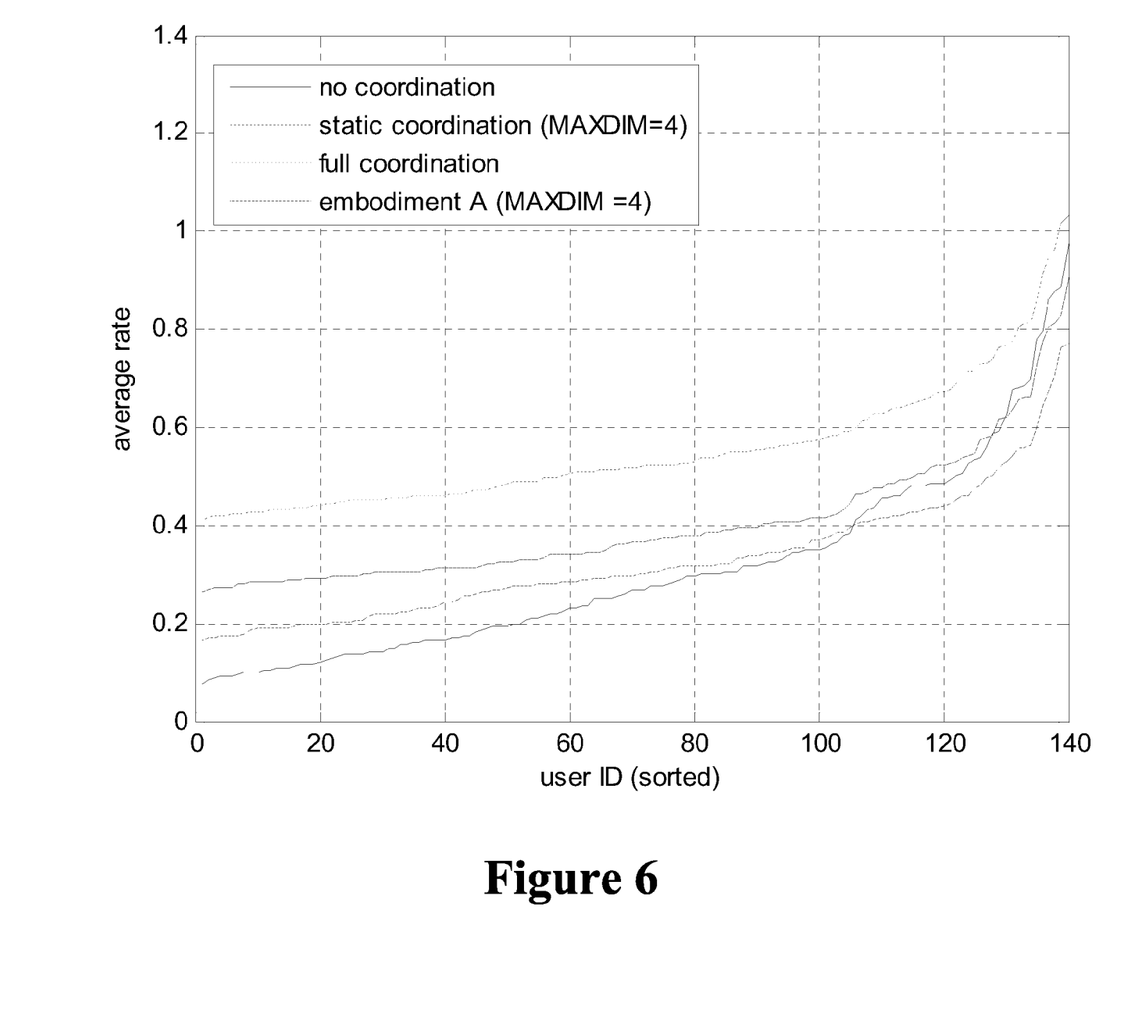
FIG. 6 shows a simulated average rate per user as a function of the user identifier for uncoordinated and coordinated algorithms.

FIG. 6 shows a simulated average rate per user as a function of the user identifier for uncoordinated and coordinated algorithms. The horizontal axis indicates the user identifier (which has been sorted in order of increasing average rate) and the vertical axis indicates the average rate. The probabilities shown in FIG. 5 are computed using a system simulator that assumes that the wireless communication system includes 7 single antenna base stations and wraparound. The wraparound is designed in order to take into account of the effects of the cooperation at the edges of the central cluster. Consequently, each simulated user is affected by the same number of interfering base stations and each base station can potentially collaborate with the same number of neighbour base stations. Each single-antenna user is dropped with uniform probability inside each cell. Fairness is guaranteed by a proportional fairness scheduler. The SNR is defined as the reference SNR ad the cell vertex. A ZF precoder has been used. The simulation results assume that there are 20 users per cell, a reference SNR of 15 dB, a maximum cluster dimension equal to 4, a path loss exponent=5, no shadowing, and a proportional fair coefficient=0.01.

As in FIG. 5, FIG. 6 demonstrates that coordination of the base stations significantly improves the average rate for virtually all users, except those users that are very close to one of the base stations and therefore achieve very high rates by communicating with this base station. Furthermore, the computationally efficient approach of performing dynamic coordination using a predetermined set of candidate coordination clusters typically provides average per-user rates that are significantly higher than the rates achieved without coordination and only somewhat less than the rates achieved by full coordination of all the base stations. The gains achieved by the dynamic coordination technique are largest for the users that have the lowest average rates, e.g., users that are furthest (on average) from any particular base station.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method for implementation in a first functional entity in a wireless communication system that includes a plurality of base stations for providing wireless connectivity, comprising:

receiving, at the first functional entity, channel state information associated with a plurality of wireless communication channels between the plurality of base stations and a plurality of mobile units;

selecting a plurality of candidate sets of base stations from the plurality of base stations and, for each of the candidate sets, selecting corresponding subsets of the plurality of mobile units for association with the corresponding candidate set, wherein the selection of the candidate sets and the associated subsets of mobile units is performed using the channel state information;

selecting one of the candidate sets of base stations and associated subset of mobile units, wherein the selected candidate set has the largest sum-rate for transmission to its associated subset of mobile units; and communicating information indicative of the selected candidate set and associated subsets of mobile units to the base stations in the selected candidate set.

2. The method of claim 1, wherein receiving the channel state information comprises receiving information indicative of at least one of a phase of a signal transmitted over the wireless communication channels, amplitude of a signal transmitted over the wireless communication channels, long-term variations in the plurality of wireless communication channels, fast fading of the plurality of wireless communication channels, covariance of the plurality of wireless communication channels, and a location of said at least one mobile unit.

3. The method of claim 1, further comprising receiving information indicating at least one of channel state information, shared data, or scheduling requirements of the plurality of mobile units.

4. The method of claim 3, wherein selecting the candidate sets and the associated subsets of mobile units comprises selecting the candidate sets and the associated subsets of mobile units using the channel state information and the scheduling requirements.

5. The method of claim 1, wherein selecting the candidate sets, selecting the subsets of mobile units, and allocating resources to the candidate sets comprises determining at least one of a beamforming coefficient, a power allocation, indexes of the base stations in the candidate sets, or indices associated with mobile units in the selected subsets.

6. The method of claim 1, wherein selecting the candidate sets comprises selecting subsets of the plurality of base stations that include less than all of the plurality of base stations.

7. The method of claim 6, wherein selecting the subsets of the plurality of base stations comprises selecting the subsets from among a predetermined plurality of subsets of the plurality of base stations.

8. The method of claim 6, wherein selecting the subsets of the plurality of base stations comprises iteratively adding base stations from the plurality of base stations to the subsets.

9. The method of claim 8, wherein selecting the subsets of the plurality of base stations comprises iteratively adding base stations and mobile units based on at least one of a throughput until the number of base stations in a selected subset reaches a selected maximum dimension or a maximum backhaul throughput.

10. The method of claim 1, wherein communicating the information indicative of the selected candidate set of base stations and the associated subset of the mobile units comprises transmitting the information to the base stations so that signals transmitted or received over the plurality of wireless communication channels between the base stations in the selected candidate set and the associated subsets of mobile units can be combined coherently.

11. A resource allocator in a wireless communication system that includes a plurality of base stations for providing wireless connectivity, the resource allocator configured to:

receive channel state information associated with a plurality of wireless communication channels between the first plurality of base stations and a plurality of mobile units;

select a plurality of candidate sets of base stations from the first plurality of base stations and select, for each of the candidate sets, corresponding subsets of the plurality of mobile units for association with the candidate set, selection of the candidate sets and the subsets being performed using the channel state information;

select one of the candidate sets, wherein the selected candidate set has the largest sum-rate of the candidate sets for transmission to its associated subset of mobile units; and communicate information indicative of the selected candidate set of base stations and the associated subsets to the base stations in the selected candidate set.

12. The resource allocator of claim 11, wherein the resource allocator is configured to perform the joint selection using at least one of a phase of a signal transmitted over the wireless communication channels, amplitude of a signal transmitted over the wireless communication channels, long-term variations in the plurality of wireless communication channels, fast fading of the plurality of wireless communication channels, covariance of the plurality of wireless communication channels, and locations of the plurality of mobile units.

13. The resource allocator of claim 11, wherein the resource allocator is configured to determine, using the channel state information, at least one of a beamforming coefficient, a power allocation, indexes of the base stations in the coordination clusters, or indices of the plurality of mobile units.

* * * * *